(12) United States Patent
Thomas et al.

(10) Patent No.: US 6,856,111 B2
(45) Date of Patent: Feb. 15, 2005

(54) METHOD AND DEVICE FOR CONTROLLING ANGULAR SPEED OF AN ELECTROMECHANICAL DRIVE TRAIN WITH LITTLE DAMPING

(75) Inventors: Jean-Luc Thomas, Fontainebleau (FR); Alain Oustaloup, Talence (FR); Jocelyn Sabatier, Talence (FR); Serge Poullain, Arpajon (FR); Patrick Latteux, Massy (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/479,106
(22) PCT Filed: May 6, 2002
(86) PCT No.: PCT/FR02/01548
§ 371 (c)(1),
(2), (4) Date: Mar. 10, 2004
(87) PCT Pub. No.: WO02/097546
PCT Pub. Date: Dec. 5, 2002

(65) Prior Publication Data
US 2004/0158425 A1 Aug. 12, 2004

(30) Foreign Application Priority Data
May 29, 2001 (FR) .......................................... 01 06987

(51) Int. Cl.$^7$ ................................................ H02P 5/00
(52) U.S. Cl. ........................ 318/268; 318/432; 318/561; 700/55; 700/56; 701/102
(58) Field of Search .................................. 318/268, 561, 318/609, 610, 611, 612, 630, 632, 623, 432; 700/42, 56, 58, 59, 55; 701/102; 702/151

(56) References Cited
U.S. PATENT DOCUMENTS

| | | | | |
|---|---|---|---|---|
| 5,525,877 A | * | 6/1996 | Umida | 318/432 |
| 5,545,957 A | * | 8/1996 | Kubo et al. | 318/432 |
| 5,929,587 A | * | 7/1999 | Kang | 318/623 |
| 5,959,422 A | * | 9/1999 | Kang | 318/561 |
| 6,336,070 B1 | * | 1/2002 | Lorenz et al. | 701/102 |
| 6,564,110 B1 | * | 5/2003 | Makino et al. | 700/56 |
| 6,567,711 B1 | * | 5/2003 | Hosek et al. | 700/55 |
| 2003/0097193 A1 | * | 5/2003 | Makino et al. | 700/42 |
| 2004/0024565 A1 | * | 2/2004 | Yu et al. | 702/151 |

OTHER PUBLICATIONS

Ferretti, G. et al., "Motor and load velocity estimation for digital servo drives: an application to robots with elastic joints", *Industrial Electronics, Control and Instrumentation*, 1994, IECON '94, 20$^{th}$ International Conference on Bologna, Italy, Sep. 5–9, 1994, New York, NY, USA, IEEE, Sep. 5, 1994, pp. 1748–1753.

Oustaloup, A. et al., "First generation scalar CRONE control: application to a two DOF manipulator and comparison with non linear decoupling control", Proceedings of the International Conference on Systems, Man and Cybernetics, Le Touquet, Oct. 17–20, 1993, New York, IEEE, US, vol. 3, Oct., 17, 1993, pp. 453–458.

(List continued on next page.)

*Primary Examiner*—Paul Ip
(74) *Attorney, Agent, or Firm*—Sughrue Mion, PLLC (57) ABSTRACT

Method and device for controlling the angular speed of an electromechanical drive train with little damping. The control of the speed of the load driven in rotation by an electromechanical drive train with little damping, possibly having transmission nonlinearities such as play, without measuring said speed, is accomplished by using an observer in conjunction with a robust CRONE-type non-integer order controller, the physical realization of which is achieved by an integer order controller obtained by approximation in the frequency domain. The device thus provides good damping for the system in the presence of resonance frequencies and excellent robustness, while still allowing a relatively simple adjustment.

15 Claims, 4 Drawing Sheets

OTHER PUBLICATIONS

Oustaloup, A. et al.., "The great principles of the CRONE control", Proceedings of the International Conference on Systems, Man and Cybernetics, le Touquet, Oct. 17–20, 1993, New York, IEEE, US vol. 3, Oct. 17, 1993, pp. 118–129.

Lin F–J, "Robust speed–controlled induction–motor dirve using EKF and RLS estimatiors", IEE Proceedings: Electric Power Applications, Institution of Electrical Engineers, GB, vol. 143, no. 3, May 10, 1996, pp. 186–192.

* cited by examiner

PRIOR ART

METHOD AND DEVICE FOR CONTROLLING ANGULAR SPEED OF AN ELECTROMECHANICAL DRIVE TRAIN WITH LITTLE DAMPING

BACKGROUND OF THE INVENTION

1. Field of the Invention

The invention concerns a method of controlling the angular mechanical speed of a load driven in rotation by an electromechanical drive train with little damping, and possibly having non-linearities such as transmission play, in the absence of a measurement of angular speed of the load.

The invention also concerns a device for implementing this speed control method.

Throughout the text, the term "load" designates indiscriminately any mechanism that can be driven in rotation by means of an electromagnetic drive train with little damping. Thus, without being limited thereto, the load can be composed of a roller of a rolling mill or paper manufacturing machine, a ship propeller, a railroad drive axle, etc.

Moreover, the expression "electromagnetic drive train" designates an assembly including a torque actuator formed by a power converter and an electric motor of any type, as well as a drive train through which this actuator drives the load.

Finally, the expression "with little damping" means that the electromechanical drive train has mechanical resonance frequencies. These frequencies are defined by the drive train's parameters, such as inertia and rigidity. In the context of the invention, these parameters are not well known or vary during operation, which results in uncertainty or variation of the resonance frequencies of the electromagnetic drive train and of the associated amplitudes.

2. Description of Related Art

Figure 1:
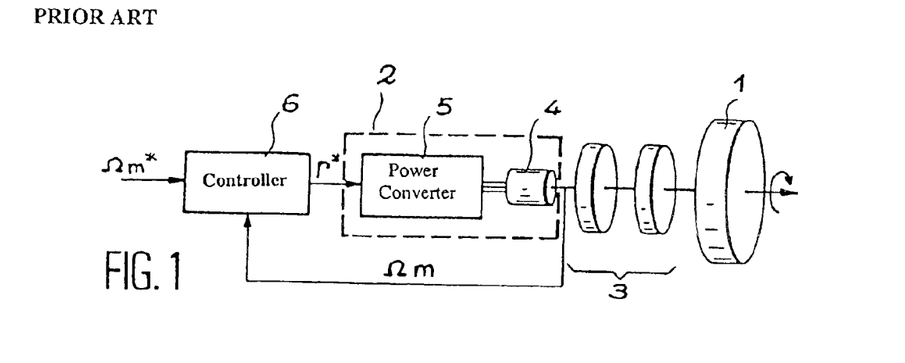
FIG. 1, already described, diagrammatically represents a closed loop servo system according to the prior art.

Diagramatically represented in FIG. 1 of the attached drawings is a known type of closed loop servo system providing the control of the speed of rotation of a load 1, driven by a torque actuator 2 through a drive train 3. The torque actuator 2 includes an electric motor 4 coupled to a power converter 5.

The control of the speed of the motor 4 is provided by a controller 6 that receives a reference signal $\Omega_m^*$ representative of the desired speed of the motor 4. When there is no measurement of the speed of the load 1, the controller 6 also receives a signal $\Omega_m$ representative of the actual speed of the motor 4. In response, the controller 6 issues a torque reference signal $\Gamma^*$, which controls the torque actuator 2.

Among existing controllers, for example, are PI (Proportional Integral), PID (Proportional Integral Derivative), $H_\infty$, QFT (Quantitative Feedback Theory), and RST.

In the frequency domain, and using Laplace transforms, it is known that the response of a controller is characterized by a rational transfer function C(s), which corresponds to the ratio of two polynomials N(s)/D(s), where s designates the complex operational variable of the system in question. The transfer function of the open loop system that includes the controller is represented in the Black, Nyquist, or Bode plan, by a curve called "frequential pattern," which shows the changes in gain and phase difference between the system's input and output, as a function of the real part ω of the operational variable s.

The different controllers are distinguished from each other particularly by the degree of each of the polynomials N(s) and D(s), that is, by their number of zeros (roots of the numerator) and poles (roots of the denominator). When the system is high order, with little damping, that is, when it has a high number of poles and zeros, only a high order controller makes it possible to meet the objectives of robustness in performance and stability. However, this also results in increasing the number of coefficients of the controller's polynomials, and this consequently makes the optimal adjustment of the controller more difficult.

When a PI or PID controller is used, the degrees of the associated polynomials are two and three coefficients, respectively. The adjustment is therefore simple. However, to achieve the objectives of robustness in performance and stability is no longer possible in the presence of an electromechanical drive train characterized by resonant modes, and possibly by non-linearities such as transmission play.

To remedy the difficulties that occur when a PI or PID controller is used in an electromechanical drive train with little damping, it has been proposed to associate with said controller a state feedback based on a signal issued by an estimator. This solution is described in the thesis of Marius Goslar entitled "Ein Beitrag zur anwendungsorientierten Zustands-regelung elektrischer Hochleistungsantriebe," presented on Aug. 14, 1998 and published in Great Britain by "Conservatree Print & Design" ISBN 0953473503.

More precisely, the abovementioned thesis concerns a case in which the angular speed of the load is known. It is proposed to use the genetic algorithms to optimize the coefficients of the polynomials of the controller.

This known solution provides good damping of the system when resonance frequencies are present. However, it is still not very satisfactory in terms of robustness. Moreover, the use of the genetic algorithms to calculate the coefficients of the polynomials of the controller makes the adjustment of said controller particularly complex.

When an $H_\infty$, QFT, or RST controller is used, the degrees of the polynomials are appreciably higher. These controllers are called "robust" because they allow the controlled system to preserve its stability and performance under nominal conditions, that is, where there are uncertainties about the parameters, and possibly nonlinearities in the transmission, such as transmission play. However, they have a high number of coefficients that makes their adjustment particularly complex.

Regardless of the type of controller used, the robust control of the angular speed of the load is made difficult when it is not possible to have a direct measurement of this speed.

SUMMARY OF THE ILLUSTRATIVE EMBODIMENTS OF THE INVENTION

A specific object of the invention is a method and device for controlling the mechanical speed of a load driven in rotation through an electromechanical drive train with little damping, without measuring this speed, while presenting satisfactory nominal static and dynamic performances and good robustness, for a minimum number of control coefficients.

According to the invention, this result is achieved by a method of controlling the speed of a load driven in rotation by an electric motor through an electromechanical drive train with little damping, according to which the real speed of the motor is measured and a torque actuation reference quantity $\Gamma^*$ of the motor with the measured speed $\Omega_m$ of the motor and a reference speed $\Omega_L^*$ of the load are determined, characterized in that said reference quantity $\Gamma^*$ is determined:

by calculating an estimated speed $\hat{\Omega}_L$ of the load by an observer the inputs of which are the reference quantity $\Gamma^*$ and an innovation error represented by the weighted difference between the measured speed $\Omega_m$ of the motor and an estimated speed $\hat{\Omega}_m$ of the motor;

by calculating the difference between the reference speed $\Omega_L^*$ of the load and the estimated speed $\hat{\Omega}_L$ of the load; and by using this calculated difference as input of a robust CRONE-type non-integer order controller, the physical realization of which is provided by an integer order controller, obtained by approximation in the frequency domain.

In the method thus defined, the calculation of the estimated speed of the load enables an effective control of this speed in the absence of its measurement. In practice, this calculation is done by an observer, such as a Kalman filter, suitable for reconstructing the internal state of the electromechanical drive train from a dynamic model thereof.

Appropriately, the observer uses a dynamic model such as:

$$\begin{bmatrix} \dot{X}_{CC} \\ \dot{X}_{AE} \\ \Gamma_L \end{bmatrix} = \begin{bmatrix} [A_{CC}] & \begin{bmatrix} couplage \\ 1/2 \end{bmatrix} & \begin{bmatrix} couplage \\ 1et2/3 \end{bmatrix} \\ [0] & [A_{AE}] & \begin{bmatrix} couplage \\ 1et2/3 \end{bmatrix} \\ [0] & [0] & [0] \end{bmatrix} \begin{bmatrix} X_{CC} \\ X_{AE} \\ \Gamma_L \end{bmatrix} + \begin{bmatrix} B \\ 0 \end{bmatrix} \Gamma^*,$$

(couplage = coupling)

in which $A_{CC}$, $A_{AE}$, and B are matrices of coefficients assigned respectively to the drive train, to the electrical actuator, and to the nature of the disturbance of the resisting torque applied to the load, $X_{CC}$, $X_{AE}$, and $\Gamma_L$ representing respectively the status of the drive train, the electrical actuator and the resisting torque applied to the load. Moreover, the expressions "couplage1/2" and "couplage1et2/3" designate respectively a matrix of coupling coefficients between the electrical actuator and the drive train and a matrix of coupling coefficients between the electrical actuator-drive train unit and the load.

Furthermore, the use of a non-integer order controller to produce the integer order controller being used to correct the estimated speed of the load makes it possible to benefit from the properties of robustness of this type of control while limiting the number of control coefficients to a value comparable to that of non-robust PI or PID type controls. Thus a robust performance is ensured of the speed control with respect to variations of the parameters of the drive train, such as inertia and rigidity, and with respect to the non-linearities of the system such as transmission play. In practice, the number of control coefficients here is equal to three, which considerably simplifies the adjustment of the controller.

These advantages derive from the remarkable properties of a robust non-integer order control, or CRONE (registered trademark). The characteristics of this control are described in detail in the work "La Commande CRONE, du Scalaire au Multivariable" [CRONE control, from Scalar to Multivariable] by A. Oustaloup and B. Mathieu, Hermes, 1999.

Appropriately, and according to the characteristics peculiar to the third generation CRONE control as set forth in the above-mentioned work, a non-integer order control is used, the transmittance $\beta(s)$ of which is such that:

$$\beta(s) = y_0 \left[ \left( \frac{\omega_s}{s} \right)^n \right]_{C_j}, \text{ with } n \in C_j,$$

where $n=a+ib$ is a complex non-integer order of integration of which the real part a determines the phase placement of the pattern at the central frequency $\omega_g$ and of which the imaginary part b determines the slope of the pattern with reference to the vertical, $C_j$ in the Nichols plan, and $y_0$ is a gain placement. The letters a, b, and $\omega_g$ correspond to the controller's adjustment coefficients. The central frequency $\omega_g$ is relative to the controller's response time. It is also used in the relationships $$\omega_A = \frac{\omega_g}{k}$$

and $\omega_B = k\omega_g$, in which $\omega_A$ and $\omega_B$ are extreme frequencies defining the range of frequencies in which the robustness of performance and stability should be ensured, and k is a dependent coefficient of said range of frequencies.

In the case of an electromechanical drive train having multiple resonances, as many rejection filters as there are resonant modes are associated with this transmittance, as described in section 3.4 ("Cas des procédés résonants" [cases of resonant processes]) in the abovementioned work.

Preferably, the integer order controller is obtained by effecting a frequency truncation at low and high frequencies, defined by low $\omega_b$ and high $\omega_h$ frequency boundaries, and by calculating, by approximation in this range of frequencies ($\omega_b$, $\omega_h$), the equivalent integer order transmittance $C_N(S)$ from the following formula:

$$C_N(s) = C_0 \prod_{k=-N}^{N} \frac{1 + \frac{s}{\omega'_k}}{1 + \frac{s}{\omega_k}},$$

in which:

$$\frac{\omega'_{k+1}}{\omega'_k} = \frac{\omega_{k+1}}{\omega_k} + \alpha\eta,$$

$$\frac{\omega'_{k+1}}{\omega_k} = \eta \text{ and } \frac{\omega_k}{\omega'_k} = \alpha,$$

with $\alpha > 1$ and $\eta > 1$, and where $C_0$ is the gain at zero frequency.

The invention also concerns a device for controlling the speed of a load driven in rotation by an electric motor through an electromechanical drive train with little damping, comprising means for measuring the real speed of the motor and means for determining a torque actuation reference quantity $\Gamma^*$ from a speed signal $\Omega_m$ issued by said speed measuring means and from a set point signal $\Omega_L^*$ representative of a reference speed of the load, characterized in that the means for determining said reference quantity include:

an observer the inputs of which are the reference quantity $\Gamma^*$ and an innovation error represented by the weighted difference between the measured speed $\Omega_m$ of the motor and an estimated speed $\hat{\Omega}_m$ of the motor, the observer being able to calculate an estimated speed $\hat{\Omega}_L$ of the load and the difference between the reference speed $\Omega_L^*$ of the load and the estimated speed $\hat{\Omega}_L$ of the load;

a robust CRONE-type non-integer order controller, using as an input the calculated difference between the reference speed $\Omega_L^*$ of the load and the estimated speed $\hat{\Omega}_L$ of the load and the physical realization of which is provided by a integer order controller, obtained by approximation in the frequency domain.

BRIEF DESCRIPTION OF DRAWINGS

By way of non-limiting example, a preferred form of embodiment of the invention will now be described, with reference to the attached drawings in which.

DETAILED DESCRIPTION OF THE ILLUSTRATIVE EMBODIMENTS OF THE INVENTION

Figure 2:
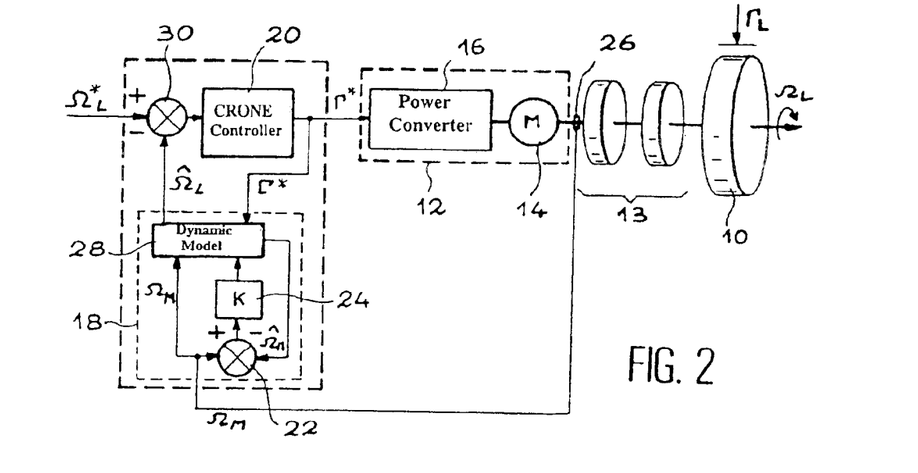
FIG. 2 is a view comparable to FIG. 1, which diagrammatically represents a servo system that includes a device for controlling the angular speed of the load according to the invention.

As illustrated very diagrammatically in FIG. 2, a speed control device according to the invention is designed to control the speed of rotation of a load 10 driven in rotation by means of an electromechanical drive train. Said electromechanical drive train includes a torque actuator 12 that drives the load 10 in rotation through a drive train 13. The torque actuator 12 has an electric motor 14 coupled to a power converter 16.

It is assumed that the electromechanical drive train has little damping and there are no means to measure the mechanical speed of the load 10.

According to the invention, the control of the speed of rotation of the load 10 is provided by associating an observer 18 and a CRONE-type non-integer order controller 20.

More precisely, a function of the observer 18 is to calculate an estimated speed of rotation $\hat{\Omega}_L$ of the load 10. To that end, the observer 18 receives at a first input a first signal $\Gamma^*$, representative of a reference quantity of torque actuation of the motor 14. The observer 18 calculates at 22 an innovation error, represented by the difference between the real angular speed $\Omega_m$ of the motor 14 and an estimated angular speed $\hat{\Omega}_m$ of the motor 14. This difference is weighted by a weighting coefficient K, as represented at 24 in FIG. 2.

The reference quantity of the motor's actuation torque, represented by the first signal $\Gamma^*$, corresponds to a desired actuation torque of the motor 14. The first signal $\Gamma^*$ is taken directly at the output of the CRONE controller 20 before being injected into the torque actuator 12.

For purposes of simplification, the speed of rotation of the output shaft of the motor 14 is called "real angular speed $\Omega_m$ of the motor." This speed can be measured by any known means such as a speed sensor 26, without going beyond the scope of the invention. A signal representing the real angular speed $\Omega_m$ of the motor is received at a second input of the observer 18.

The observer 18 incorporates a dynamic model 28 that calculates the estimated speed of rotation $\hat{\Omega}_L$ of the load 10 as well as the estimated angular speed $\hat{\Omega}_m$ of the motor 14, used to calculate the innovation error. To that end, the observer 18 reconstructs the electromechanical drive train and continuously resets the states of the system by calculating the innovation error at 22.

This dynamic model rests on the internal representation of the system, usually expressed by the equations:

$$\begin{cases} \dot{\hat{X}} = A\hat{X} + BU + K(\hat{Y} - Y) \\ \hat{Y} = C\hat{X} + DU. \end{cases}$$

In these equations, U represents the vector of the inputs from the electromechanical drive train, X represents an element of the space state of the system, Y represents the vector of the outputs of the system, and A, B, C, and D are matrices the coefficients of which are real numbers. The symbols $\hat{X}$ and $\hat{Y}$ represent the estimated values of X and Y obtained by the implementation of the model.

In practice, the observer 18 can be comprised of a Kalman filter. In this case, the calculations are done linearly and in discrete time. In particular, this type of observer has the advantage of having minimal variations. However, any other observer that can obtain comparable results, such as a Luenberger filter, can be used without going beyond the scope of the invention.

In order to ensure a faithful representation of the internal state of the system, the model takes into account the electromagnetic model and the mechanical model of the electromechanical drive train, as well as the disturbances occurring on the resisting torque applied to the load.

Thus, the representation of the torque actuator 12 comprising the power converter 16 and the motor 14 is provided by a first continuous equivalent state model, the free development of which is represented by:

$$[\dot{X}_{AE}] = [A_{AE}][X_{AE}].$$

In a comparable way, the drive train 13 is represented by a second continuous equivalent state model, the free development of which is represented by:

$$[\dot{X}_{CC}] = [A_{CC}][X_{CC}].$$

The interconnection of the two units thus defined leads to representing the electromechanical drive train in a form the free development of which is represented by:

$$\begin{bmatrix} \dot{X}_{CC} \\ \dot{X}_{AE} \end{bmatrix} = \begin{bmatrix} [A_{CC}] & \begin{bmatrix} couplage \\ 1/2 \end{bmatrix} \\ [0] & [A_{AE}] \end{bmatrix} \begin{bmatrix} X_{CC} \\ X_{AE} \end{bmatrix}.$$

In this relationship, the expression "couplage1/2" [coupling1/2] designates a matrix of coupling coefficients between the torque actuator 12 and the drive train 13.

In order also to take into account the disturbances of the torque $\Gamma_L$ applied to the load, it is assumed that $\dot{\Gamma}_L=0$.

The system can then be stated in the form of a dynamic model so that the response to the torque setting input $\Gamma^*$ can be represented by:

$$\begin{bmatrix} \dot{X}_{CC} \\ \dot{X}_{AE} \\ \dot{\Gamma}_L \end{bmatrix} = \begin{bmatrix} [A_{CC}] & \begin{bmatrix} couplage \\ 1/2 \end{bmatrix} & \begin{bmatrix} couplage \\ let2/3 \end{bmatrix} \\ [0] & [A_{AE}] & \begin{bmatrix} couplage \\ let2/3 \end{bmatrix} \\ [0] & [0] & [0] \end{bmatrix} \begin{bmatrix} X_{CC} \\ X_{AE} \\ \Gamma_L \end{bmatrix} + \begin{bmatrix} B \\ 0 \end{bmatrix} \Gamma^*.$$

In this relationship, the expression "couplage1et2/3" [coupling1and2/3] designates a matrix of coupling coefficients between the unit formed by the torque actuator 12 and the drive train 13, and the load 10. The coefficients of the coupling matrices "couplage1/2" and "couplage1et2/3" as well as the different coefficients of the matrices $A_{CC}$, $A_{AE}$, and B are defined by a person skilled in the art as a function of the respective characteristics of the drive train 13, the torque actuator 12, and the disturbances of the resisting torque applied to the load 10. As can be seen, this operation derives from the simple implementation of basic knowledge of a specialist in automation.

Figure 3:
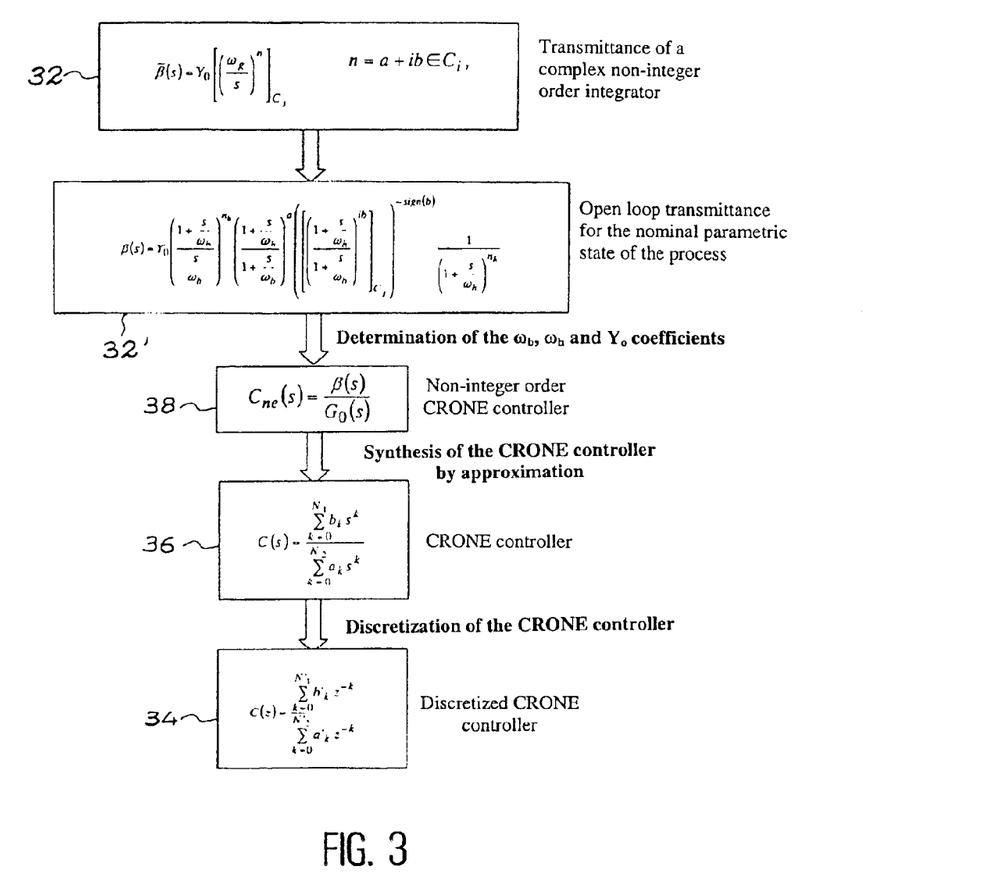
FIG. 3 is a block diagram that represents in more detail the CRONE controller of the control device according to the invention.

As is diagrammatically represented in FIG. 3, the controller 20 is comprised of a robust CRONE-type non-integer order controller 32, the physical realization of which is provided by an integer order controller 34, obtained by approximation in the frequency domain.

The robust non-integer order controller 32 is a third generation CRONE-type controller, that is, it uses a generalized non-integer order frequency pattern. The transmittance $\beta(s)$ of this pattern is given by the relationship:

$$\beta(s) = y_0 \left[ \left( \frac{\omega_s}{s} \right)^n \right]_{C_j}, \text{ with } n \in C_j, \quad (1)$$

in which n is a complex non-integer order of integration, such as n=a+ib. The coefficients a and b as well as the term $\omega_g$ constitute the only adjustment coefficients of the frequency pattern used by the robust controller 32. In other words, the adjustment of the controller is made as soon as the values of these three coefficients are established. This characteristic constitutes an essential advantage of the invention, because it enables an adjustment that is practically as simple as in the case when a non-robust PI or PID controller is used.

The real part a of n determines the placement in phase of the pattern at the central frequency $\omega_g$, in the Black or Nichols plan, designated by $C_j$. The imaginary part b determines the slope of the pattern with reference to the vertical in said plan.

In the relationship (1) above, $y_0$ represents a gain placement. The central frequency $\omega_g$ is relative to the controller's response time. It is also used to determine the frequencies $$\omega_A = \frac{\omega_g}{k}$$

and $\omega_B = k\omega_g$, with $\omega \in [\omega_A, \omega_B]$. In other words, the letters $\omega_A$ and $\omega_B$ designate the extreme frequencies defining the range of frequencies in which the robustness in performance and stability can be assured. Finally, the letter k designates a coefficient that depends on said range of frequencies defined between $\omega_A$ and $\omega_B$.

For more details concerning the robust controller 32 and a summary thereof, it will be useful to refer to the abovementioned work of Alain Oustaloup and Benoît Mathieu, and particularly Chapter 2 entitled: "Commande CRONE de troisième génération" [third generation CRONE control].

When the electromechanical drive train has multiple resonances, as many rejection filters are associated with the transmittance $\beta(s)$ of the frequency pattern as there are resonant modes in said drive train. It will be useful to refer to section 3.4 of the abovementioned work of Alain Oustaloup and Benoît Mathieu, incorporated here by reference.

The integer order controller 34 comprises a robust monovariable controller. It functions in discrete time with a sampling period that can be greater than or equal to that of the observer 18. Thus, in the form of embodiment described here by way of example, the sampling period of the integer order controller 34 is five times longer than that of the observer 18.

The integer order controller 34 receives a representative signal of the difference (number 30 in FIG. 2) between the reference speed $\Omega_L^*$ of the load 10 and the estimated speed $\hat{\Omega}_L$ of the load. The reference speed $\Omega_L^*$ of the load 10 represents the desired or set speed of rotation of the load. The estimated speed $\hat{\Omega}_L$ of the load 10 is furnished by the observer 18. Based on this difference, the integer order controller issues a representative signal $\Gamma^*$ of the torque that should be applied to the motor 14 by the power converter 16.

The determination of the discrete integer order controller 34 is done by first performing, if necessary, a low and high frequency truncation of the non-integer order controller 32, by means of an integer order transmittance $\beta_b(s,\omega_b)$ defined by a high frequency boundary $\omega_b$ and an integer order transmittance $\beta_h(s,\omega_h)$ defined by a high frequency boundary $\omega_h$. These two frequency boundaries can be symmetrically distributed with reference to the extreme frequencies $\omega_A$ and $\omega_B$ of the generalized pattern, so that $$\omega_b = \frac{\omega_A}{K'}$$

and $\omega_h = K'\omega_B$, K' being a coefficient equal to 10, for example, so that $$\frac{\omega_g}{\omega_b} \gg 1 \text{ and } \frac{\omega_g}{\omega_h} \ll 1.$$

This frequency truncation makes it possible to desensitize the controller 32 with respect to the high frequencies (e.g., measurement noises) and to ensure a zero static error. For more details on this subject, it will be useful to refer to the work of Alain Oustaloup and Benoît Mathieu as cited above (see in particular the Bode diagram of FIG. 1.3). The calculation of the adjustment coefficients of the controller is then done on the basis of the frequency truncated non-integer order controller 32' (FIG. 3).

The integer order controller 36 is then determined by an approximation in the frequency domain of the non-integer controller 32'. The transmittance $C_N(S)$ of the integer order controller 36 is then given by the relationship:

$$C_N(s) = C_0 \prod_{k=-N}^{N} \frac{1 + \frac{s}{\omega'_k}}{1 + \frac{s}{\omega_k}}, \quad (2)$$

in which:

$$\frac{\omega'_{k+1}}{\omega'_k} = \frac{\omega_{k+1}}{\omega_k} = \alpha\eta,$$

$$\frac{\omega'_{k+1}}{\omega_k} = \eta \text{ et } \frac{\omega_k}{\omega'_k} = \alpha,$$

with $\alpha>1$ and $\eta>1$ and where $C_0$ represents the zero frequency gain.

The integer order controller 36 is then discretized on the basis of a sampling frequency that can be greater than or equal to that of the observer 18, in order to obtain the discrete integer order controller 34 that will be used in the real time calculator.

The observer 18 as well as the controllers 32, 32', 34, and 36 use one or more calculators.

Figure 4:
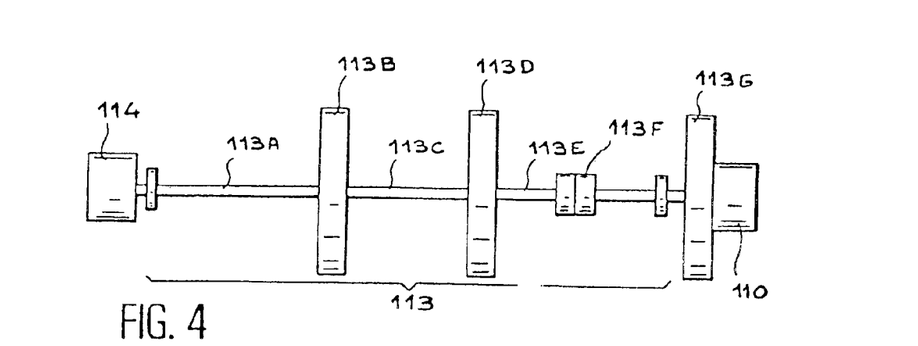
FIG. 4 represents very diagrammatically a model of an electromechanical drive train used to test the control device according to the invention.

Represented in FIG. 4 is a model that was made to validate through testing, in a concrete case, the results obtained by the implementation of the speed control method according to the invention. More specifically, comparative tests were made on the model of FIG. 4, using successively a PI controller of the prior art and a CRONE type observer controller unit according to the invention.

The model used for the tests comprised a first motor 114, "speed control," comparable to the motor 14 in FIG. 2. The motor 114 was mechanically connected to a second motor 110, "the load," through a drive train 113 comprised of a first extension piece 113A, a first inertial test weight 113B, a second extension piece 113B, a second inertial test weight 113D, a third extension piece 113E that includes a spacer 113F and a third inertial test weight 113G.

In the model thus produced, the motor 110 acts as the load 10 in FIG. 2 and the drive train 113 acts as the train 13.

Each of the motors 114 and 110 had an inertia of 0.00488 $m^2$*kg and the rigidity of the extension pieces 113A, 113C, and 113E were respectively 357 N*m/rad, 175 N*m/rad, and 78 N*m/rad. Finally, the nominal inertias of the inertial weights 113B, 113D, and 113G were respectively equal to 0.014 $m^2$*kg, 0.03 $m^2$*kg, and 0.068 $m^2$*kg, while still being able to simulate large errors causing these inertias to vary between one half and twice their nominal values.

Figure 5:
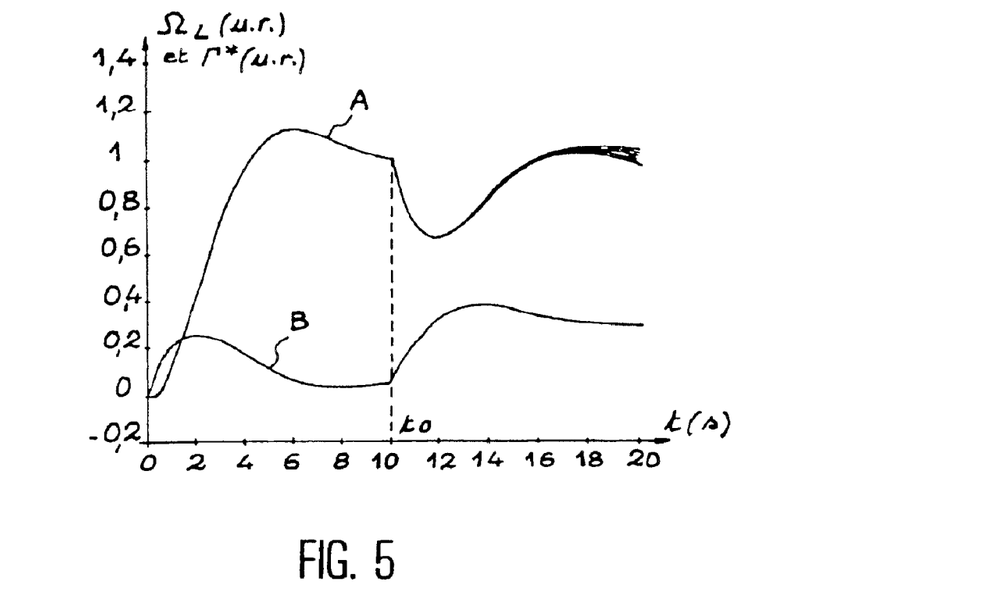
FIG. 5 represents, at A, the development curve of the speed $\Omega_L$ of the load driven by the electromechanical drive train of FIG. 4 (in reduced units) as a function of time t (in seconds) and, at B, the development curve of the actuating torque $\Gamma^*$ (in reduced units) delivered by the controller as a function of time t, when a PI controller of the prior art and a system like the one illustrated in FIG. 1 are used.

The tests performed on this model by using a PI controller of the prior art are illustrated by the curves A and B in FIG. 5. More specifically, the curve A shows the development of the speed of rotation $\Omega_L$ of the load (in reduced units) as a function of the time t (in seconds), and the curve B shows the development of the torque $\Gamma^*$ delivered by the controller (in reduced units) as a function of the time t (in seconds). As can be seen, a disturbance of the load torque at the moment $t_0$ results in particular in a relatively long period before return to equilibrium and by the system entering into resonance.

Figure 6:
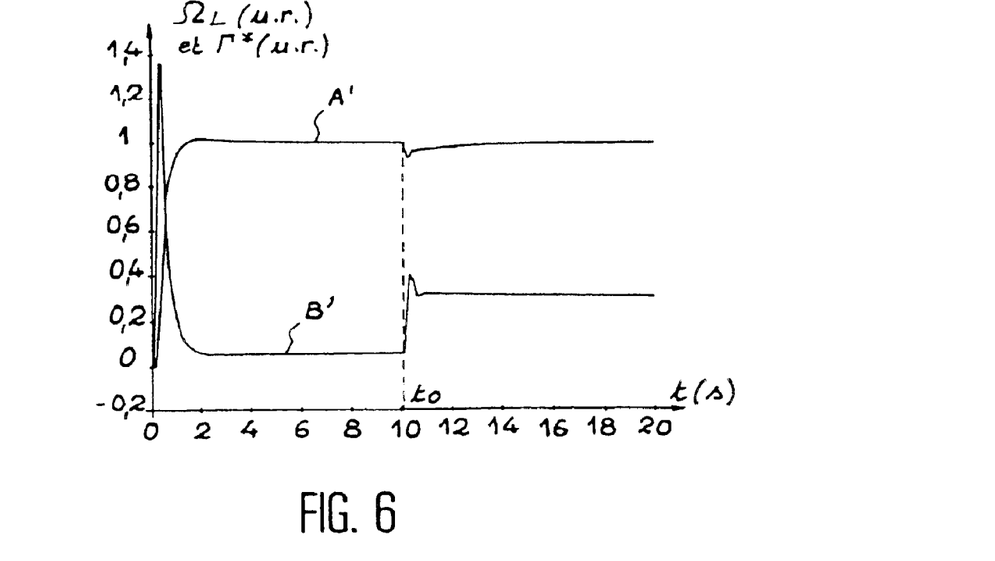
FIG. 6 represents, at A', the development curve of the speed $\Omega_L$ of the load driven by the electromechanical drive train of FIG. 4 (in reduced units) issued by the controller as a function of time t (in seconds) and, at B', the development curve of the actuating torque $\Gamma^*$ (in reduced units) delivered by the controller as a function of time t, when an observer (Kalman filter) is associated with a non-integer CRONE controller, according to the invention and according to the assembly illustrated in FIG. 2.

As curves A' and B' in FIG. 6 illustrate, the situation is very different when the speed control device according to the invention is used. More precisely, the curve A' shows the development of the speed of rotation $\Omega_L$ of the load (in reduced units) as a function of the time t (in seconds) and the curve B' shows the development of the torque $\Gamma^*$ delivered by the controller (in reduced units) as a function of the time t (in seconds). As can be seen, in this case the system very quickly returns to equilibrium after the disturbance of the load torque at the time $t_0$. Moreover, no resonance phenomenon occurs, unlike in the prior art.

The curves in FIG. 6 show that the speed control device according to the invention has the desired damping capacities when there are resonance frequencies in the electromechanical drive train.

Another series of tests was performed to show the robustness capacity of the speed control device according to the invention. These tests are illustrated in FIGS. 7 and 8.

Figure 7:
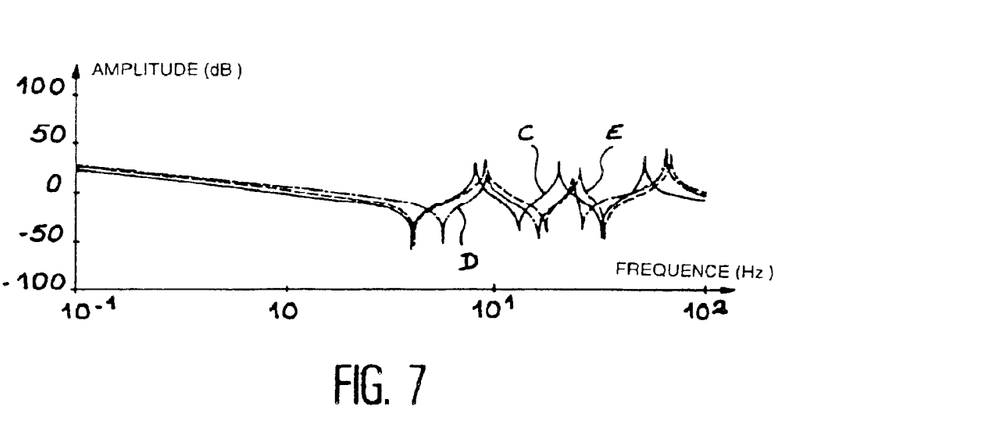
FIG. 7 represents the transfer functions (amplitude of the signal in dB, as a function of the frequency in Hz) of the drive train corresponding to the model of FIG. 4, respectively when the inertias have their nominal values (curve C) and in two extreme cases of variation of said inertias (curves D and E)

Represented in FIG. 7 is the transfer function of the electromechanical drive train of the model illustrated in FIG. 4, that is, the development of the amplitude of the signal (in dB) as a function of the frequency (in Hz), respectively in the case where the inertial weights 113B, 113D, and 113G are nominal (curve C), in the case where the inertias of the first weight 113B and third weight 113G are divided by two and second weight 113D is multiplied by two (curve D), and in the case where the intertias of the first weight 113B and third weight 113G are divided by two and the second weight 113D is nominal (curve E). As can be seen, the resonance frequencies of the electromechanical drive train are significantly modified.

Figure 8:
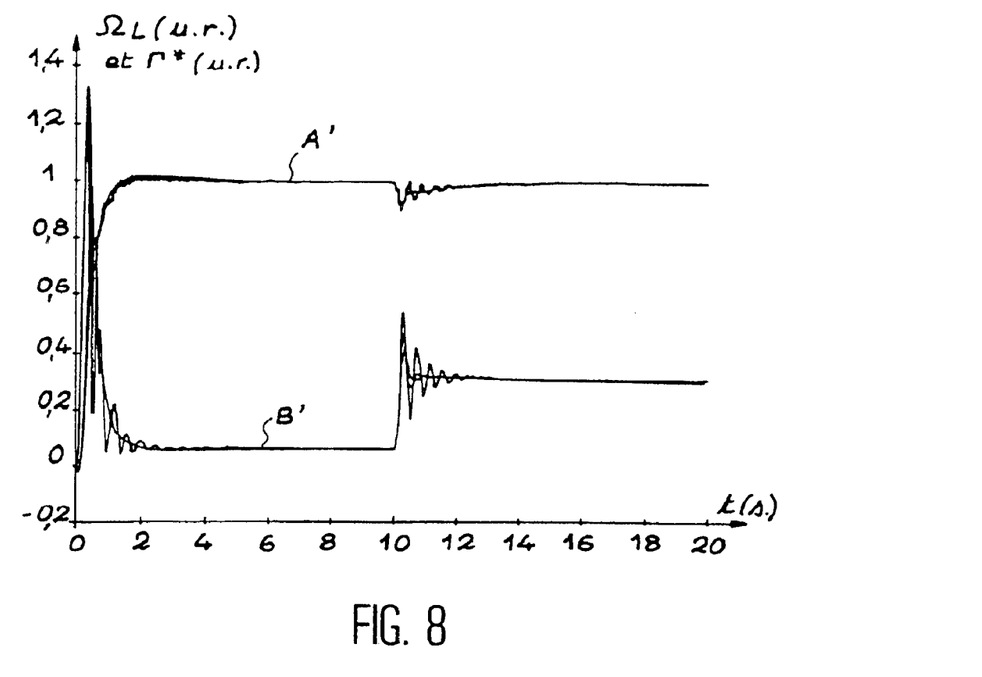
FIG. 8 represents the curves A' and B' of FIG. 6 in the case when the inertias have their nominal values and in two extreme cases of variation of said inertias, on the model of FIG. 4.

In FIG. 8, the curves A' and B' are shown that were obtained in the cases corresponding to the transfer functions illustrated at C, D, and E of FIG. 7. It can be seen that, in spite of the large variations in the inertias and in the resonance frequencies resulting therefore, the closed loop system remains stable.

These experiments confirm that the speed control according to the invention has excellent properties of robustness in spite of the absence of measurement of the controlled speed, unlike the methods of the prior art using PI controllers.

Furthermore, the association of an observer and a CRONE-type controller, according to the invention, makes it possible to obtain these properties of robustness with only three adjustment coefficients (the real a and imaginary b parts of the complex non-integer integration order n and the frequency $\omega_g$).

Of course, the method and device according to the invention can be applied to any system comprising a load driven in rotation by an electromechanical drive train with little damping, regardless of the nature of the load and irrespective of the characteristics of the electromechanical drive train, and particularly its resonance frequencies and possible play.

What is claimed is:

1. Method of controlling a speed of a load driven in rotation by an electric motor through an electromechanical drive train with little damping, comprising:

measuring a real speed of the motor; and determining a torque actuation reference quantity $\Gamma^*$ of the motor based on the measured speed $\Omega_m$ of the motor and a reference speed $\Omega_L^*$ of the load;

said determining the torque actuation reference quantity $\Gamma^*$ comprising:

calculating an estimated speed $\hat{\Omega}_L$ of the load by an observer, inputs of which are the reference quantity $\Gamma^*$ and an innovation error represented by a weighted difference between the measured speed $\Omega_m$ of the motor and an estimated speed $\hat{\Omega}_m$ of the motor;

calculating a difference between the reference speed $\Omega_L^*$ of the load and the estimated speed $\hat{\Omega}_L$ of the load; and inputting the difference between the reference speed $\Omega_L^*$ of the load and the estimated speed $\hat{\Omega}_L$ of the load to a robust CRONE-type non-integer order controller, the physical realization of which is provided by an integer order controller, obtained by approximation in the frequency domain.

2. Method according to claim 1, further comprising calculating the estimated speed $\hat{\Omega}_L$ of the load from a dynamic model of the electromechanical drive train.

3. Method according to claim 2, in which the dynamic model includes an electromagnetic model, a mechanical model, and disturbances of the torque of the load.

4. Method according to claim 3, in which the dynamic model is represented by:

$$\begin{bmatrix} \dot{X}_{CC} \\ \dot{X}_{AE} \\ \dot{\Gamma}_L \end{bmatrix} = \begin{bmatrix} [A_{CC}] & [couplage1/2] & [couplage1et2/3] \\ [0] & [A_{AE}] & [couplage1et2/3] \\ [0] & [0] & [0] \end{bmatrix} \begin{bmatrix} X_{CC} \\ X_{AE} \\ \Gamma_L \end{bmatrix} + \begin{bmatrix} B \\ 0 \end{bmatrix} \Gamma^*,$$

in which $A_{CC}$, $A_{AE}$, and B are matrices of coefficients assigned respectively to the drive train, to the electrical actuator, and to the nature of the disturbance of the resisting torque applied to the load, $X_{CC}$, $X_{AE}$, and $\Gamma_L$ representing respectively the status of the drive train, the electrical actuator, and the resisting torque applied to the load, the expressions "couplage1/2" and "couplage1e2/3" designate respectively a matrix of coupling coefficients between the electrical actuator and the drive train and a matrix of coupling coefficients between the electrical actuator-drive train unit and the load.

5. Method according to claim 2, wherein the observer comprises a Kalman filter.

6. Method according to claim 1, wherein the non-integer order controller has a transmittance $\beta(s)$ represented by:

$$\beta(s) = y_0 \left[ \left( \frac{\omega_g}{s} \right)^n \right]_{C_j},$$

where n=a+ib is a complex non-integer order of integration of which the real part a determines a phase placement of a pattern at a central frequency $\omega_g$ and of which the imaginary part b determines a slope of the pattern with reference to the vertical, $C_j$ in the Nichols plan, and $y_0$ is a gain placement and the frequency $\omega_g$ is relative to the controller's response time and is represented by the relationships $$\omega_A = \frac{\omega_g}{k}$$

and $\omega_B = k\omega_g$, in which $\omega_A$ and $\omega_B$ are extreme frequencies defining a range of frequencies in which robustness of performance and stability should be ensured, and k is a dependent coefficient of said range of frequencies.

7. Method according to claim 6, in which the electromechanical drive train has multiple resonances and the controller has as many rejection filters associated with the transmittance $\beta(s)$ of the frequency pattern as there are resonant modes in said drive train.

8. Method according to claim 6, in which the integer order controller is obtained by effecting a frequency truncation at low and high frequencies, defined by low $\omega_b$ and $\omega_h$ frequency boundaries, and by calculating, by approximation in this range of frequencies ($\omega_b$, $\omega_h$), the equivalent integer order transmittance $C_N(s)$ from the following formula:

$$C_N(s) = C_0 \prod_{k=-N}^{N} \frac{1 + \frac{s}{\omega'_k}}{1 + \frac{s}{\omega_k}},$$

in which:

$$\frac{\omega'_{k+1}}{\omega'_k} = \frac{\omega_{k+1}}{\omega_k} = \alpha\eta,$$

$$\frac{\omega'_{k+1}}{\omega_k} = \eta \text{ and } \frac{\omega_k}{\omega'_k} = \alpha,$$

with $\alpha > 1$ and $\eta > 1$, and where $C_0$ is the gain at zero frequency.

9. Device for controlling a speed of a load driven in rotation by an electric motor through an electromechanical drive train with little damping, comprising means for measuring the real speed of the motor and means for determining a torque actuation reference quantity $\Gamma^*$ of the motor from a measured speed $\omega_m$ issued by said speed measuring means and from a set point signal $\Omega_L^*$ representative of a reference speed of the load, characterized in that the means for determining said reference quantity comprises:

an observer, the inputs of which are the reference quantity $\Gamma^*$ and an innovation error represented by a weighted difference between the measured speed $\Omega_m$ of the motor and an estimated speed $\hat{\Omega}_m$ of the motor, the observer calculating an estimated speed $\hat{\Omega}_L$ of the load and the difference between the reference speed $\omega_L^*$ of the load and the estimated speed $\hat{\Omega}_L$ of the load;

a robust CRONE-type non-integer order controller, which has an input comprising the calculated difference between the reference speed $\Omega_L$ of the load and the estimated speed $\hat{\Omega}_L$ of the load, and the physical realization of which is provided by an integer order controller, obtained by approximation in the frequency domain.

10. Device according to claim 9, in which the observer calculates the estimated speed $\hat{\Omega}_L$ of the load from a dynamic model of the electromechanical drive train.

11. Device according to claim 10, in which the dynamic model includes three interconnected matrix units, taking into account the electromagnetic model, the mechanical model, and the disturbances of the torque of the load, respectively.

12. Device according to claim 9, in which the observer is a Kalman filter in discrete time.

13. Device according to claim 9, in which the non-integer order controller has a non-integer order transmittance $\beta(s)$ represented by:

$$\beta(s) = y_0 \left[ \left( \frac{\omega_g}{s} \right)^n \right]_{C_j},$$

where n=a+ib is a complex non-integer order of integration of which the real part a determines a phase placement of a pattern at a central frequency $\omega_g$ and of which the imaginary part b determines the slope of the pattern with reference to the vertical, $C_j$ in the Nichols plan, and $y_0$ is a gain placement and the frequency $\omega_g$ is relative to the controller's response time and is represented by the relationships $$\omega_A = \frac{\omega_g}{k}$$

and $\omega_B = k\omega_g$, in which $\omega_A$ and $\omega_B$ are extreme frequencies defining a range of frequencies in which robustness of performance and stability should be ensured, and k is a dependent coefficient of said range of frequencies.

14. Device according to claim 13, in which the electromechanical drive train has multiple resonances and the controller has as many rejection filters as there are resonant modes in said drive train.

15. Device according to claim 13, in which the integer order controller effects a frequency truncation at low and high frequencies, defined by low $\omega_b$ and high $\omega_h$ frequency boundaries, and has an integer order transmittance $C_N(s)$ represented by:

$$C_N(s) = C_0 \prod_{k=-N}^{N} \frac{1 + \frac{s}{\omega'_k}}{1 + \frac{s}{\omega_k}},$$

in which:

$$\frac{\omega'_{k+1}}{\omega'_k} = \frac{\omega_{k+1}}{\omega_k} = \alpha\eta,$$

$$\frac{\omega'_{k+1}}{\omega_k} = \eta \text{ and } \frac{\omega_k}{\omega'_k} = \alpha,$$

with $\alpha > 1$ and $\eta > 1$, and where $C_0$ is the gain at zero frequency.

* * * * *